United States Patent Office 2,790,367
Patented Apr. 30, 1957

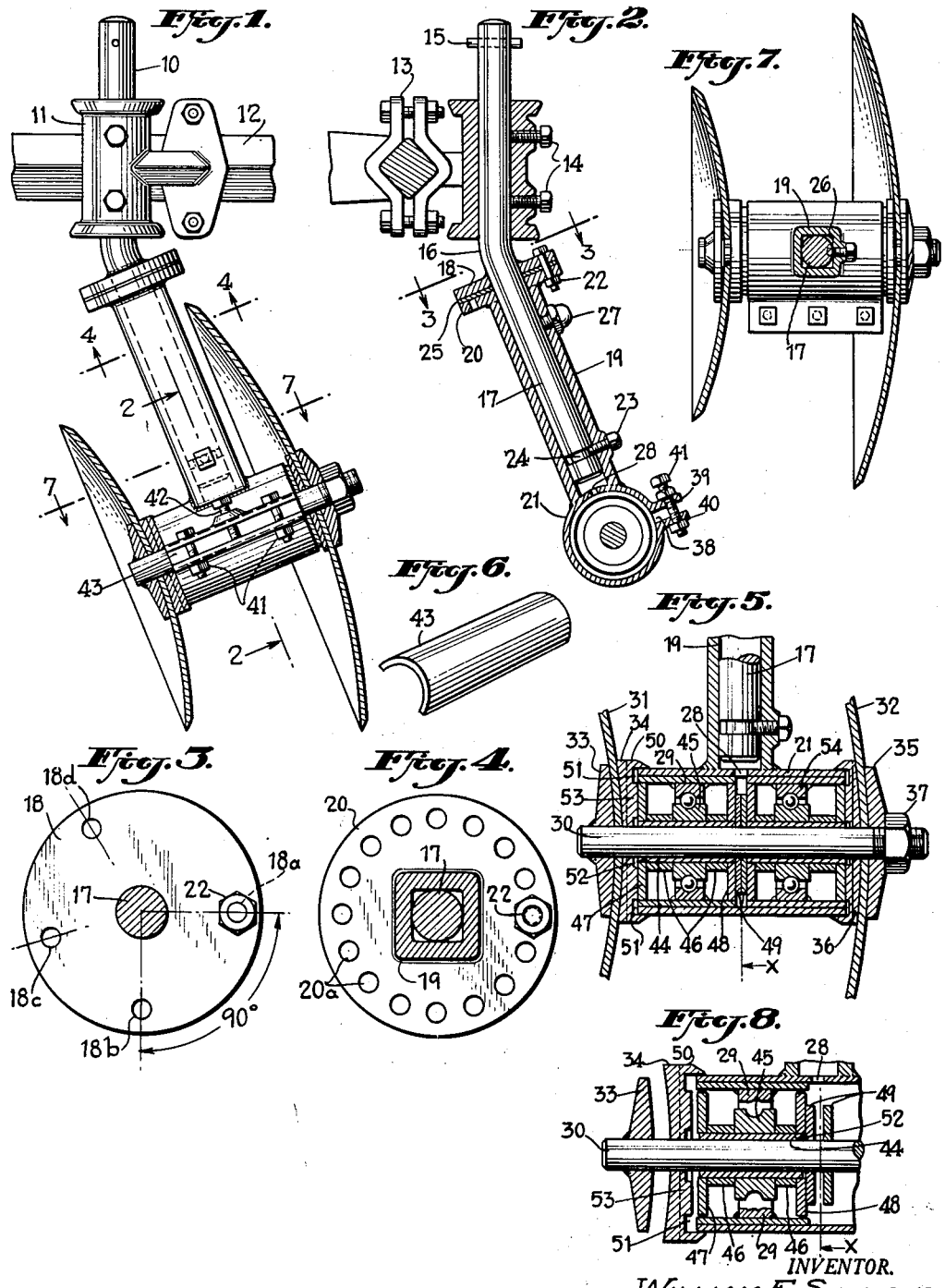

2,790,367

CULTIVATOR DISK GANGS

William E. Simmons, East Palatka, Fla.

Application September 23, 1953, Serial No. 381,841

4 Claims. (Cl. 97—54)

This invention relates to an improved disk gang unit for a bedder-cultivator.

It is an object of my invention to provide a simpler, stronger and more efficient disk gang unit construction of the type being adjustable to different and closer cultivating angles and positions for certain kinds of work. The invention comprises a disk gang, having one or more cultivator disks of like or different diameters, adjustably supported by a perpendicularly disposed shaft-like spindle, which spindle is adjustably suspended by suitable means from a horizontally disposed tool cross-bar of a tractor of the row crop type.

It is an object of my invention to provide means for angularly adjusting the cultivator disks with respect to a vertical plane passing through the axis of the perpendicularly disposed spindle, and also means for angularly adjusting said cultivator disks with respect to the horizontal plane of the ground which is to be cultivated.

According to my invention, the perpendicularly disposed spindle which supports the disk gang is adjustably mounted for both clockwise and counterclockwise rotative movement within a bearing clamped transversely to the horizontally disposed tractor cross-bar, and said spindle is provided with a lower angular bent portion to which is secured the disk gang. Such rotation of the spindle will cause travel of the disk gang in a circular path about the axis of the perpendicular portion of the spindle, thereby effecting angular adjustment of the cultivator disks relative to a vertical plane passing through said axis. In further accordance with my invention, means are provided for independent rotation, both clockwise and counterclockwise, of the disk gang about the angular spindle portion, thereby effecting angular adjustment of the cultivator disks relative to the horizontal plane of the ground which is to be cultivated. The purpose and accomplished result of the aforesaid two independent adjustment means for the cultivator blades is the production of finer and more efficient cultivating results.

It is a still further object of my invention to construct and arrange all parts of the unit so that the upwardly disposed peripheral edges of the cultivator disks will at all times, and when disposed at extremely useful angles, be entirely free from contact with each other and all mechanical parts that could hinder and limit the full angular settings of the disks.

An additional object of my invention is to provide an elongated spindle housing of square cross-section surrounding the lower angular portion of the spindle, which housing functions both as a sturdy and economical journal for said angular spindle portion and also as a reservoir for lubricant material to be fed to the moving parts of the disk gang.

A still further object of my invention is to provide an expedient and economical ball-bearing housing secured to the lower end of said elongated housing, and being formed of internally unmachined tubing having a diameter approximately equal to the external diameter of the ball-bearings, the said tubing having a single slit or saw-cut extending therethrough for its entire length and clamping means provided to bind said tubing and ball-bearings firmly together therein.

In the drawings:

Fig. 1 is a view, partly in section, of a disk gang unit of my invention having a disk gang with two disks of different diameters attached to an adjustable spindle clamped detachably to the rear square cross-bar (said bar partly broken away) of a tractor, showing the disk gang unit revolved to the right with the periphery of the disks positioned at ground level;

Fig. 2 is a cross-sectional view of the device of Fig. 1, taken on the line 2—2 of Fig. 1, but with the disk gang thereof removed, and as viewed approximately from an end of the square cross-bar, but with the adjustable spindle slewed at right angles to said cross-bar;

Fig. 3 is an enlarged sectional view taken on the line 3—3 of Fig. 2 showing in plan the four-hole upper index plate welded to the angular portion of the spindle;

Fig. 4 is an enlarged sectional view taken on the line 4—4 of Fig. 1 showing a plan view of the lower face of a 16-hole index plate as welded to the upper end of the elongated spindle housing;

Fig. 5 is a cross-sectional view, partly broken away of the disk gang ball-bearing and its housing and related parts showing a part of the angular portion of the spindle and its surrounding housing;

Fig. 6 is a perspective view of a thin, narrow metal, lubricant sealing strip for the saw-cut in the ball-bearing housing;

Fig. 7 is a view taken on the line 7—7 of Fig. 1 showing the top face of the bearing housing with its welded longitudinally disposed upper clamp ledge, binding bolts and spreader screw; and Fig. 8 represents a diagrammatic cross-sectional and somewhat spread apart, fragmentary view showing the washers and sleeves of the left-hand ball-bearing assembly of Fig. 5 mounted on the disc gang arbor left of the vertical dotted line $x$.

Referring in more detail to the drawings, the disk gang unit of the invention comprises a vertically disposed bent steel spindle 10 of, for example, 1½" in diameter, which is adapted to be pivoted about in a vertically disposed journal or arm 11. This journal 11 may be removably attached to a horizontally disposed tool cross-bar 12, of the type usually about 90 inches long and carried at the rear of a tractor (not shown) of the row crop type by means of a bracket clamp 13. The spindle may be adjustably held in the journal at any desired elevational or angular position by means of conventional set screws 14 and is provided at its upper end with a cross-pin 15 designed to prevent the spindle from sliding downwardly out of the journal when these set screws are loosened for adjusting the position of the spindle.

Spindle 10 is angularly bent as at 16, preferably about 22° from the axis of rotation of the upper journaled portion thereof, so as to provide a lower angular spindle portion 17. A flat circular indexed plate 18, preferably 6" in diameter and having a central bore of 1½" diameter for passage therethrough of the angular portion of the spindle, is welded to the upper end of the angular portion of the spindle at right angles thereto just below the above-described bend. This lower angular portion of the spindle is enclosed by an elongated housing of square cross-section 19 having approximately 2" outside width and 1½" inside width. To the upper end of housing 19 there is welded at right angles thereto a differently indexed 6" diameter plate 20, and at the lower end of the housing 19 there is welded at right angles thereto a tubular ball-bearing housing 21 approximately 5" long and having a 3" diameter. This housing 19 surrounds the lower angular portion of the spindle for almost its entire length and serves as a journal therefore which may be completely revolved thereabout. The indexed plates 18 and 20 are normally disposed in abutting parallel relationship and are held together in this position by means of a lock bolt 22 which is adapted to pass through aligned holes of the respective plates. It will be of course understood that this lock bolt may be withdrawn when it is desired to angularly adjust the plates to different radial positions relative to one another. During this period of adjustment or readjustment of the relative angular positioning of the plates, the housing 19 is held in place on the spindle by means of a retaining screw 23 threaded through a suitable aperture formed in the housing wall and extending inwardly into engagement with an annular groove 24 formed on the lower end of the spindle. As will be described in more detail hereinafter, when the desired relative angular adjustment of the plates has been selected, the lock bolt 22 may be passed through the then matched index holes and the plates firmly clamped together thereby with a lubricant sealing gasket 25 interposed therebetween as shown, it being understood that the edge of the gasket will void the index holes.

In order to provide ready angular adjustment of the plates relative to one another, plate 18 may be provided with four 9/16" diameter holes, all bored at equal radial distances from the center of the plate, but spaced apart at uneven arcuate lengths as shown in Fig. 3. Thus, the first or zero hole thereof is positioned as indicated at the point 18a, the next hole 18b at 90° distant from 18a, the next hole 18c at ½" less than the distance between holes 18a and 18b, and the next hole 18d at ¼" less than the distance between holes 18b and 18c.

Lower plate 20 as shown in Fig. 4 may be provided with 16 correspondingly sized holes 20a, each preferably ½" in diameter, and all bored at the same equal radial distances from the center of plate 20 as are the holes of plate 18, but being peripherally spaced at equidistant arcuate lengths, 1" apart from one another. It will be of course understood that when the lock bolt 22 is disengaged from the plates, the elongated spindle housing 19 may be rotated, together with its attached plate 20, to any desired degree about the angular portion of the spindle. The above-described differential arrangement of the holes in these index plates permits the locking of the square housing at any one of a multiplicity of angular positions as close as ¼" apart. Since the ball-bearing housing 21 and the disk gang (as described below) are secured for similar rotation with the housing 19, this arrangement provides for very precise angular positioning of the cultivator disks relative to the horizontal plane of the ground so as to be suitable for the varied nature of the cultivating to be done.

As will be seen with reference to Fig. 7, besides acting as a journal for the angular portion of the spindle, the housing 19 acts as a lubricant reservoir. Thus, this housing provides four longitudinally extending spaces 26 between the spindle periphery and the square corners of the housing itself. Lubricant may be injected through a suitable port 27, and it may be stored within these spaces 26 so as to permit continuous supply thereof by gravity to the angular portion of the spindle and thence to the ball-bearings and disk gang arbor through an oil feed port 28 provided in the top of the ball-bearing housing 21 for that purpose.

The ball-bearing housing 21 may be formed of conventional round stock having no need of interior machining. Within this housing there may be provided two conventional ball-bearing units 29 which are adapted to provide the rotative mounting for a suitable steel cultivator disk gang arbor 30 extending centrally therethrough and carrying the cultivator disks 31, 32.

As best shown in Fig. 5, a convex face bumper washer 33 is welded to the left-hand end of the arbor 30, and a concave-plano faced clamp washer 34 is loosely fitted thereon with the cultivator disk 31 interposed therebetween. Similarly, a concave faced bumper washer 35 and a convex-plano faced clamp washer 36 are loosely fitted on the right-hand end of said arbor with the cultivator disk 32 interposed therebetween. A jamb nut 37 is threaded upon the extreme right-hand end of the arbor and is adapted upon tightening to clamp firmly together all the parts mounted on and revolvable with said arbor.

As stated, the ball-bearing units 29 may be of conventional design having, for example, a 3" outer casing diameter. In order to facilitate the insertion and retention of these ball-bearings within the housing 21, the latter is provided with a longitudinally extending saw-cut 38, the width of this saw-cut being shown exaggerated in Figs. 1 and 2 for purposes of clear illustration. A pair of flat metal strips or ears 39, 40 are secured, as for example, by welding to the edges of this saw-cut. These strips, as shown, project laterally outwardly and practically radially from the respective adjacent outer edges of the saw-cut, and each strip is bored at two points along its length to receive suitable clamp bolts 41. The upper strip 39 is also provided with a screw 42 threaded therein with its lower end normally free from the upper face of the lower strip 40, the object of this screw 42 being, when sufficiently advanced, to force apart the edges of said saw-cut so as to enlarge temporarily the inner diameter of the housing 21 and thereby permit endwise introduction thereinto of the ball-bearing units 29 and their related parts. Means are, of course, provided for closing this saw-cut opening against escape of lubricating material from the bearing housing during operation of the unit and may, for example, comprises a long thin lubricant-sealing brass strip 43 of about 1" wide by 5" long by .005" thickness inserted between the outer casing of the ball-bearing units and the inner wall of the bearing housing at the vicinity of the saw-cut.

As stated, each of the ball-bearing units 29 may be of conventional design and comprise an inner tube 44 surrounding the arbor, around which tube the inner ball race 45 is fitted. On each side of this ball race there are disposed spacer sleeves 46, with a flat washer or flange 47 disposed alongside the outer spacer unit and a compression washer 48 disposed alongside the inner spacer unit. A pair of separator washers 49 are positioned between the compression washers of the respective bearing units and are dimensioned with small enough diameters so as to provide a space to permit the free passage of lubricant from the elongated housing 19 through port 28 into the bearing housing so as to insure lubrication of all movable parts within that housing.

There are also disposed on the arbor between the washers 47 of each bearing unit and the clamp washers 34, 36, thin washers 50. These thin washers 50 are each provided with an outer annular recess 51 near their periphery and an inner annular recess 52 surrounding the arbor so as to form a flat projecting surface 53 adapted to contact and bear against the surface of the respective washers 47. It should be of course understood that the washers 47 may be formed integrally as a flange of spacer units 46. Regardless of which particular form of structure may be used for the washers 47, the periphery of the same is smaller in diameter than the inner diameter of the ball-bearing housing and clears the inner surface thereof. Also, it should be understood that the outer annular recess 51 provides clearance for the housing 21 and the outer ball-bearing casings, while the inner annular recess 52 provides clearance for the inner bearing unit tubes 44 when the cultivator disks are clamped for operative movement in the unit.

During assembly of the unit, as stated above, the screw 42 may be advanced sufficiently so as to force apart the saw-cut 38 sufficiently to permit endwise insertion of the bearing units 29. Thereafter the arbor with its washers and cultivator discs is assembled as shown, and the jamb nut 37 tightened so as to draw the bumper washers, cultivator disks, clamp washers, ball-bearing sleeves and the pair of separator washers tightly together on the arbor. Thereupon, the clamp bolts may be taken up sufficiently so as to bind the outer ball-bearing casings, as well as the sealing strip 43, against rotation or shifting within the housing 21. This action of the bolts 41 will thus bind the ball-bearing outer casings and their respective outer ball races, such as 54, against rotation in the bearing housing, while their respective inner ball-bearing races 45 will be clamped as aforesaid to the arbor for rotation therewith. Thus, it will be seen that when the jamb nut 37 is tightly set up on the arbor 30, all elements mounted on said arbor will be drawn and bound tightly together and will revolve freely with said arbor around and within the outer ball-bearing casings, which latter have been clamped against rotation within the housing by the clamp bolts 41.

The outer casings and surfaces of the ball-bearing assemblies and also the thin metal sealing strip 43 are coated with a sealing compound to keep out sand and dirt.

It should be understood that no particular type of ball-bearing unit is necessary as long as the outer casing of such ball-bearing units be of such circumferential form in diameter as to be freely insertable endwise into the elongated tubular housing and be capable of being securely clamped therein with the inner race of each unit and its associated parts being mounted and clamped to the disk gang arbor and being rotatable therewith.

As will be evident from the above description, taken in conjunction with the drawings, two distinct adjustment means are provided for positioning the cultivator disks of the disk gang at precisely the desired location and angular relationship to the ground. The first adjustment means effects angular adjustment of the plane of each cultivator disk relative to a vertical plane passing through the axis of the perpendicular spindle portion. Thus in operation, with the index plates 18 and 20 locked against relative angular displacement by virtue of engagement of the lock bolt 22, the spindle 10 may be first rotated in its journal 11 so as to cause rotation of the disk gang with its cultivator disks 31, 32 along a circular path around the axis of the perpendicularly disposed portion of the spindle. This first adjustment means thus permits positioning of the disks in any desired location along this circular path as dictated by the requirements of the cultivating operation to be engaged in. By this adjustment the disk gang with its disks may be moved from an extreme position to the right of the axis of the perpendicular spindle portion, as shown in Fig. 1, to an extreme position to the left of that axis, as well as any desired intermediate position along the circular path around the spindle axis. It will of course be understood that the disk gang may be locked in any of these desired positions by taking up on the conventional set screws 14. The second adjustment means comprises the abutting index plates 18 and 20 and lock bolt 22. Thus in operation once the first adjustment has been accomplished as described above, this lock bolt 22 is disengaged from the aligned holes of these index plates, and the disk gang with its disks rotated as desired about the lower angular spindle portion 17. Such movement, as will be obvious, effects angular adjustment of the plane of each disk relative to the horizontal plane of the ground, thereby permitting the desired angular inclination of these disks to the ground level so that they will take the proper bite into the soil to be cultivated.

What is claimed and desired to be secured by Letters Patent, is:

1. In a bedder-cultivator tractor of the row crop type wherein a horizontally disposed tool bar is provided on the tractor, the combination which comprises a disk gang assembly adjustably suspended from said tool bar, said disk gang assembly comprising a spindle having an upper portion disposed substantially perpendicular to said tool bar and an angular, bent lower portion, an elongated housing surrounding said lower angular spindle portion and carrying a bearing housing at its lower end, an arbor with cultivating disk means rotatably mounted in said bearing housing, said upper spindle portion being rotatably mounted in a journal means connected to said tool bar, and means for adjustably positioning said spindle at any desired rotative position relative to said journal means whereby said cultivator disk means may be adjustably positioned at any desired position along a circular path about the axis of the said perpendicular spindle portion, thereby effecting angular adjustment of the cultivator disk means relative to a vertical plane passing through said axis, and said elongated housing being mounted for independent rotation about the angular lower spindle portion, and means for adjustably positioning said elongated housing in any one of a number of predetermined angular positions relative to said angular spindle portion whereby angular adjustment of said cultivator disk means relative to the horizontal plane of the ground may be effected.

2. In a bedder-cultivator tractor of the row crop type wherein a horizontally disposed tool bar is provided on the tractor, the combination which comprise a disk gang assembly adjustably suspended from said tool bar, said disk gang assembly comprising a spindle having an upper portion disposed substantially perpendicular to said tool bar and an angular, bent lower portion, an elongated housing surrounding said lower angular spindle portion and carrying at its lower end a tubular ball-bearing housing having a longitudinal slot extending the entire length thereof, bearing means positioned in said tubular housing, an arbor carrying cultivator disks rotatively mounted in said bearing means, means for forcing apart the edges of the bearing housing's longitudinal slot so as to provide for endwise insertion and removal of the bearing means, means for forcing said slot edges together so as to clamp the bearing means in the tubular housing, said upper spindle portion being rotatably mounted in journal means connected to said tool bar, and means for adjustably positioning said spindle at any desired rotative position relative to said journal means, whereby said cultivator disks may be adjustably positioned at any desired position along a circular path about the axis of the said perpendicular spindle portion, thereby effecting angular adjustment of the cultivator disks relative to a vertical plane passing through said axis, and said elongated housing being mounted for independent rotation about the angular lower spindle portion, and means for adjustably positioning said elongated housing in any one of a number of predetermined angular positions relative to said angular spindle portion whereby angular adjustment of said cultivator disks relative to the horizontal plane of the ground may be effected.

3. In a bedder-cultivator tractor of the row crop type wherein a horizontally disposed tool bar is provided on the tractor, the combination which comprises a disk gang assembly adjustably suspended from said tool bar, said disk gang assembly comprising a spindle having an upper portion disposed substantially perpendicular to said tool bar and an angular, bent lower portion, an elongated housing of square cross-section surrounding said lower angular spindle portion and carrying a bearing housing at its lower end, an oil port formed in the bearing housing beneath the lower end of said spindle and elongated housing, said elongated housing providing longitudinally extending spaces between the spindle periphery and the square corners of the housing itself, thereby forming a reservoir to hold lubricant in said elongated housing for said spindle and said bearing housing, an arbor with cultivating disk means rotatably mounted in said bearing housing (said upper spindle portion being rotatably mounted in journal means connected to said tool bar, and means for adjustably positioning said spindle at any desired rotative position relative to said journal means, whereby said cultivator disk means may be adjustably positioned at any desired position along a circular path about the axis of the said perpendicular spindle portion, thereby effecting angular adjustment of the cultivator disk means relative to a vertical plane passing through said axis, and said elongated housing being mounted for independent rotation about the angular lower spindle portion and means for adjustably positioning said elongated housing in any one of a number of predetermined angular positions relative to said angular spindle portion whereby angular adjustment of said cultivator disk means relative to the horizontal plane of the ground may be effected.

4. In a bedder-cultivator tractor of the row crop type wherein a horizontally disposed tool bar is provided on the tractor, the combination which comprises a disk gang assembly adjustably suspended from said tool bar, said disk gang assembly comprising a spindle having an upper portion disposed substantially perpendicular to said tool bar and an angular, bent lower portion, an elongated housing surrounding said lower angular spindle portion and carrying a bearing housing at its lower end, an arbor with cultivating disk means rotatably mounted in said bearing housing, said upper spindle portion being mounted in bearing means for rotation relative thereto and means for adjustably positioning said spindle at any desired rotative position relative to said bearing means, whereby said cultivator disk means may be adjustably positioned at any desired position along a circular path about the axis of the said perpendicular spindle portion, thereby effecting angular adjustment of the cultivator disk means relative to a vertical plane passing through said axis, and said elongated housing being mounted for independent rotation about the angular lower spindle portion, and means for adjustably positioning said elongated housing in any one of a number of predetermined angular positions relative to said angular spindle portion whereby angular adjustment of said cultivator disk means relative to the horizontal plane of the ground may be effected, said housing positioning means comprising a first indexed plate secured to the upper end of the angular bent spindle portion, a second differently indexed plate secured to the upper end of said elongated housing, and lock bolt means adapted to secure said index plates together at the desired relative angular position.

References Cited in the file of this patent
UNITED STATES PATENTS

| | | |
|---|---|---|
| 276,292 | Seymour | Apr. 24, 1883 |
| 301,597 | Horst | July 8, 1884 |
| 616,991 | Tanner | Jan. 3, 1899 |
| 671,539 | Dempster | Apr. 9, 1901 |
| 861,704 | Brew | July 30, 1907 |
| 1,074,502 | Kanyo | Sept. 30, 1913 |
| 1,203,737 | Hoar | Nov. 7, 1916 |
| 1,760,940 | English | June 3, 1930 |
| 2,556,492 | Dockery et al. | June 12, 1951 |
| 2,603,541 | Kriegbaum | July 15, 1952 |
| 2,715,554 | Walberg | Aug. 16, 1955 |